UNITED STATES PATENT OFFICE.

ADOLPHUS G. MEIER, OF ST. LOUIS, MISSOURI.

CHEWING-GUM AND METHOD OF MAKING THE SAME.

1,171,392.

Specification of Letters Patent. Patented Feb. 8, 1916.

No Drawing. Application filed October 9, 1913. Serial No. 794,195.

*To all whom it may concern:*

Be it known that I, ADOLPHUS G. MEIER, a citizen of the United States, and residing at St. Louis, in the State of Missouri, have invented certain new and useful Improvements in Chewing-Gum and Methods of Making the Same, of which the following is a specification.

This invention relates to chewing gums and more particularly to chewing gums which perform both the function of a dentifrice and an antiseptic for the teeth and gums.

Chewing gum consists of chicle, glucose, and sugar, together with a flavoring compound. In the manufacture of chewing gum a mixture of glucose and granulated sugar is brought to a boil, and at a temperature of about 270° F. A quantity of dried chicle is stirred into the mixture, which chicle melts and mixes with the glucose and sugar. This mixture is then allowed to partially cool and is kneaded on a board with powdered sugar, so that the powdered sugar will be taken up by the comparatively soft and sticky mixture. The proportions used vary somewhat. Thus according to one formula now in use, six pounds of granulated sugar and five pounds of glucose are mixed with seven pounds of dried chicle, and this resultant mixture is kneaded with ten pounds of powdered sugar. A flavoring compound is usually added to the mixture so as to flavor the gum, or where it is desirable that the gum have antiseptic qualities, an antiseptic compound is added. After the mixture has been kneaded it is rolled out into sheets and cut into sticks.

When a chewing gum is masticated the sugar and glucose as well as the flavoring extract are dissolved out, so that after a comparatively short time nothing but the chicle is left. The chewing gum therefore loses all of its flavor in a short time. The same is true if an antiseptic is used instead of the usual flavoring compounds, and this antiseptic will soon be dissolved out leaving nothing but the chicle, as chicle does not have any qualities which cause it to retain a flavoring or antiseptic compound.

Some of the objects of this invention therefore are to produce a chewing gum which will retain an added fugitive ingredient such as a flavoring or an antiseptic compound for a long time, which will act as a dentifrice, and more specifically which dentifrice will act as an absorbent and retainer for the added flavoring or antiseptic ingredient.

Another object is to provide a novel method of making the gum.

Further objects will appear from the detailed description, and in this detailed description one method of making the gum will be described.

In the making of the chewing gum forming the subject-matter of this invention, the sugar and glucose are mixed with dried chicle or any other suitable chewing gum base in the same manner as in the process of the prior art. This mixture is then kneaded with powdered sugar and a material which will act both as a dentifrice and an absorbent vehicle for a flavoring or antiseptic compound. Powdered chalk being porous, amorphous, and abrasive, will act both as a dentifrice and as an absorbent for the fugitive flavoring or antiseptic ingredient added to the gum. In order to give the gum a flavor, the chalk is mixed with a suitable flavoring compound, such as peppermint, wintergreen, or any of the essential oils. In order to give the gum an antiseptic quality the chalk is mixed with any suitable antiseptic, such as carbolic acid, menthol, thymol, or eucalyptus. One of these fugitive ingredients in the form of a solution or of a powder is mixed with the chalk and allowed to remain in contact therewith for some time. It will be found that after a period, depending upon the nature of the fugitive ingredient used, the chalk will absorb large quantities thereof. The chalk so prepared and serving as a vehicle for fugitive ingredients is now mixed with the powdered sugar in any suitable proportion, and may replace a part of the powdered sugar ordinarily used in the kneading operation, and the gum mixture of glucose, sugar and chicle is kneaded with the powdered sugar and chalk until the latter are entirely absorbed. It will of course be understood that the mixture may first be kneaded with the powdered sugar and then kneaded with the powdered chalk. The kneaded mixture is now rolled out into sheets and cut up into sticks as before. The chewing gum so prepared consists of sugar, glucose and chicle, the usual constituents of chewing gum, and an added mixture consisting of a fugitive ingredient either in the form of a flavor or an antiseptic, combined with an insoluble, absorbing vehicle, in this case, chalk. This chalk performs several useful functions. It performs first, the function of a dentifrice for cleaning and polishing the teeth. Second, since this powdered chalk is porous and has absorbed the flavoring or antiseptic compound, it will retain its flavor or antiseptic qualities for a long time. In view of the fact that this fugitive flavoring or antiseptic compound is absorbed by the chalk instead of only mixed with the sugar, the amount of flavoring or antiseptic compound which can be placed in a given quantity of chewing gum is very much greater than heretofore. Moreover the chalk acts as a retainer and will slowly part with the flavoring or antiseptic compound; the flavor will therefore last a long time. The chalk will increase the permanent bulk of the gum considerably, as chalk is insoluble, so that it will not be necessary to use as much chicle, to have the same sized plug left in the mouth after the sugar is dissolved.

It is obvious that various changes may be made in the details of the product and method without departing from the spirit of this invention, and it is therefore to be understood that this invention is not to be limited to the specific details described.

Having thus described the invention what is claimed is:

1. A chewing gum containing an added mixture consisting of a fugitive ingredient and an insoluble, absorbent vehicle therefor.

2. A chewing gum containing an added mixture consisting of a fugitive ingredient and an insoluble dentifrice forming an absorbent vehicle for said ingredients.

3. A chewing gum containing an added mixture consisting of a fugitive ingredient and chalk, the latter forming a vehicle for said ingredient.

4. A chewing gum containing an added mixture consisting of an antiseptic and an insoluble, absorbent vehicle therefor.

5. A chewing gum containing an added mixture consisting of an antiseptic and an insoluble dentrifice forming an absorbent vehicle for said antiseptic.

6. The method of making chewing gum comprising mixing a fugitive ingredient with a vehicle therefor and adding said mixture to a gum compound.

7. The method of making chewing gum comprising mixing a fugitive ingredient with an insoluble, absorbent vehicle and adding said mixture to a gum compound.

In testimony whereof I affix my signature in the presence of these two witnesses.

ADOLPHUS G. MEIER.

Witnesses:
F. A. SCHAEFERING,
FLORENCE WALLIN.